United States Patent [19]
Hartenstine et al.

[11] Patent Number: 5,586,549
[45] Date of Patent: Dec. 24, 1996

[54] COMBINED SOLAR AND GAS HEATER

[75] Inventors: John R. Hartenstine, Landisville; Peter M. Dussinger, Lititz, both of Pa.

[73] Assignee: Thermacore, Inc., Lancaster, Pa.

[21] Appl. No.: 582,386

[22] Filed: Jan. 3, 1996

[51] Int. Cl.$^6$ .................................................. F24J 2/32
[52] U.S. Cl. ...................... 126/635; 126/612; 165/104.21
[58] Field of Search ........................... 126/613, 635, 126/609, 634, 636, 643, 642, 645, 612; 165/104.21, 104.19

[56] References Cited

U.S. PATENT DOCUMENTS

| | | | |
|---|---|---|---|
| 4,187,688 | 2/1980 | Berg | 126/613 |
| 4,280,449 | 7/1981 | Kunstle et al. | 126/427 |
| 4,523,636 | 6/1985 | Meijer et al. | 165/104.26 |
| 4,602,614 | 7/1986 | Percival et al. | 126/427 |
| 4,715,183 | 12/1987 | Meijer et al. | 126/433 |
| 4,785,633 | 11/1988 | Meijer et al. | 126/433 |

FOREIGN PATENT DOCUMENTS 90555  6/1982  Japan ......................... 126/635

*Primary Examiner*—James C. Yeung
*Attorney, Agent, or Firm*—Martin Fruitman

[57] ABSTRACT

The apparatus is a hybrid solar collector which permits heating by both solar energy and fossil fuels. The hollow solar collector structure acts as the vapor space for a heat pipe for which the heat utilization device acts as the condenser. A solar evaporator wick covers the inside surface of the solar collector, and one or more burners are located adjacent to the solar collector. Each burner has a burner evaporator wick mounted directly on the surface of the combustion chamber and the wick is either exposed within the vapor space of the solar heat pipe or made a part of an intermediate heat pipe which cools the combustion chamber surface and heats an auxiliary evaporator wick within the solar heat pipe. Thus, heat produced by either solar radiation or fuel combustion evaporates the working fluid in the solar heat pipe.

8 Claims, 4 Drawing Sheets

COMBINED SOLAR AND GAS HEATER

BACKGROUND OF THE INVENTION

This invention deals generally with stoves and furnaces and more specifically with a solar heat collector with an internal heat pipe to move the heat to a device using the heat and also including an auxiliary heat source.

Solar collectors with internal heat pipes to convey heat to devices using the heat are well known. U.S. Pat. No. 4,785,633 by Meijer et al shows such a solar collector used with a Stirling engine.

It has also been demonstrated that such a solar collector can be used with auxiliary heating, for instance from a natural gas burner. Typically, such auxiliary heat is generated within an essentially separate gas burner which is located adjacent to the solar collector structure, and the combustion products from the gas burner are directed to pass over a portion of the solar collector which has a heat pipe evaporator wick on its internal surface.

The structures of such auxiliary combustion chambers are, however, large and heavy and involve special problems. For instance, any such combustion chamber requires a massive structure, usually constructed from ceramic firebrick, for an enclosure. Essentially, the structure differs very little from a typical household furnace.

Not only must several such structures be attached to a solar collector, which may be required to move to follow the sun, but to prevent deterioration of the combustion chamber enclosures, air is usually blown through the enclosures to cool them, and any heat lost due to that cooling is wasted. Moreover, a strong support structure must be used to support the heavy weight of the several combustion chambers typically associated with a single solar collector.

SUMMARY OF THE INVENTION

The present invention eliminates these problems with the prior art devices by integrating the combustion chambers with the hollow structure of the typical solar collector.

In the preferred embodiment of the invention, the solar collector assembly is essentially constructed of two concentric curved sheets approximating hemispheres and which have different radii. These two curved sheets are the largest surfaces of a hollow structure which is defined by the two concentric curved sheets and a third section to which both are joined at their edges. The third section is typically an annular ring attached at its outer edge to a cylinder perpendicular to the plane of the ring. The annular ring is attached to the edge of the inner hemisphere and the outer cylinder is attached to the edge of the outer hemisphere. The resulting structure is essentially a hollow double walled dome.

The inner curved sheet, the one with the smaller radius, is the actual solar collector, and its surface within the hollow assembly is covered with a solar evaporator capillary wick which may extend beyond the edge of the inner sheet and across the inner surface of the annular ring if gravity is not sufficient for complete liquid distribution.

The outer curved sheet, the one with the larger radius, is typically penetrated at its center by the structure of the device which uses the heat generated within the solar collector, for instance, a Stirling engine.

The hollow structure is constructed as a heat pipe by sealing it off from access to the atmosphere, evacuating all air and other non-condensible gases from within the structure, and placing an appropriate quantity of a vaporizable liquid within it. Thus, when the outside surface of the inner curved sheet is heated by solar radiation, the liquid collected in the solar capillary wick on the inner surface is vaporized, and the vapor moves to the cooler portions of the evacuated structure, such as the heat collecting surfaces of a Stirling engine, where it condenses. Capillary arteries, tubes, or a capillary wick structure are installed within the hollow structure to return the condensed liquid to the evaporator wick at the solar collector so the heat transfer process can be continuous.

In the preferred embodiment of the invention, several gas burners are installed in combustion chambers along the periphery of the solar collector evaporator wick, either on the annular ring attached between the curved sheets or near the edge of the outer sheet.

A typical combustion chamber is a simple cylinder within which the air and gas mixture is ignited. This cylinder is inserted and sealed directly into the hollow interior of the solar collector assembly adjacent to the edge of the solar collector inner surface, so that one or more combustion chamber cylinders are essentially reentrant cavities protruding into the hollow interior of the heat pipe. A heater evaporator capillary wick is mounted on the surface of each combustion chamber reentrant cavity which is located within the hollow, evacuated, solar collector assembly, and the heater evaporator wicks are constructed to extend into contact with the solar evaporator wick.

An alternate embodiment of the combustion chamber is a more complex auxiliary structure which is attached to the peripheral wall of the outer curved sheet of the hollow solar collector. In this embodiment multiple heat pipe evaporators are located within tubes within the combustion chamber, and these burner heat pipe evaporators are interconnected with a single common condenser which is also an external wall of the solar heat pipe. The evaporator surface on the inside of the solar heat pipe is on the opposite surface of the same wall which acts as the condenser for the burner heat pipe, so that the condensing vapor of the burner heat pipe creates the heat which evaporates the liquid within the solar heat pipe.

The great advantage of these structures is that they require no auxiliary cooling of the combustion chambers and no insulation around them. The heater evaporator wicks on the outside walls of each combustion chamber or the heat pipes within the combustion chamber are all that is required to effectively cool the combustion chamber and maintain it at temperatures which assure its survival. Furthermore, the heater evaporator capillary wicks or the burner heat pipes efficiently transfer the heat generated at the burners directly to the solar collector heat pipe without the forced air heat exchangers of the prior art systems. Eliminating such external heat exchangers not only makes the heat transfer more efficient, but also reduces the size, weight, and cost of the solar collector assembly.

DETAILED DESCRIPTION OF THE INVENTION

Figure 1:
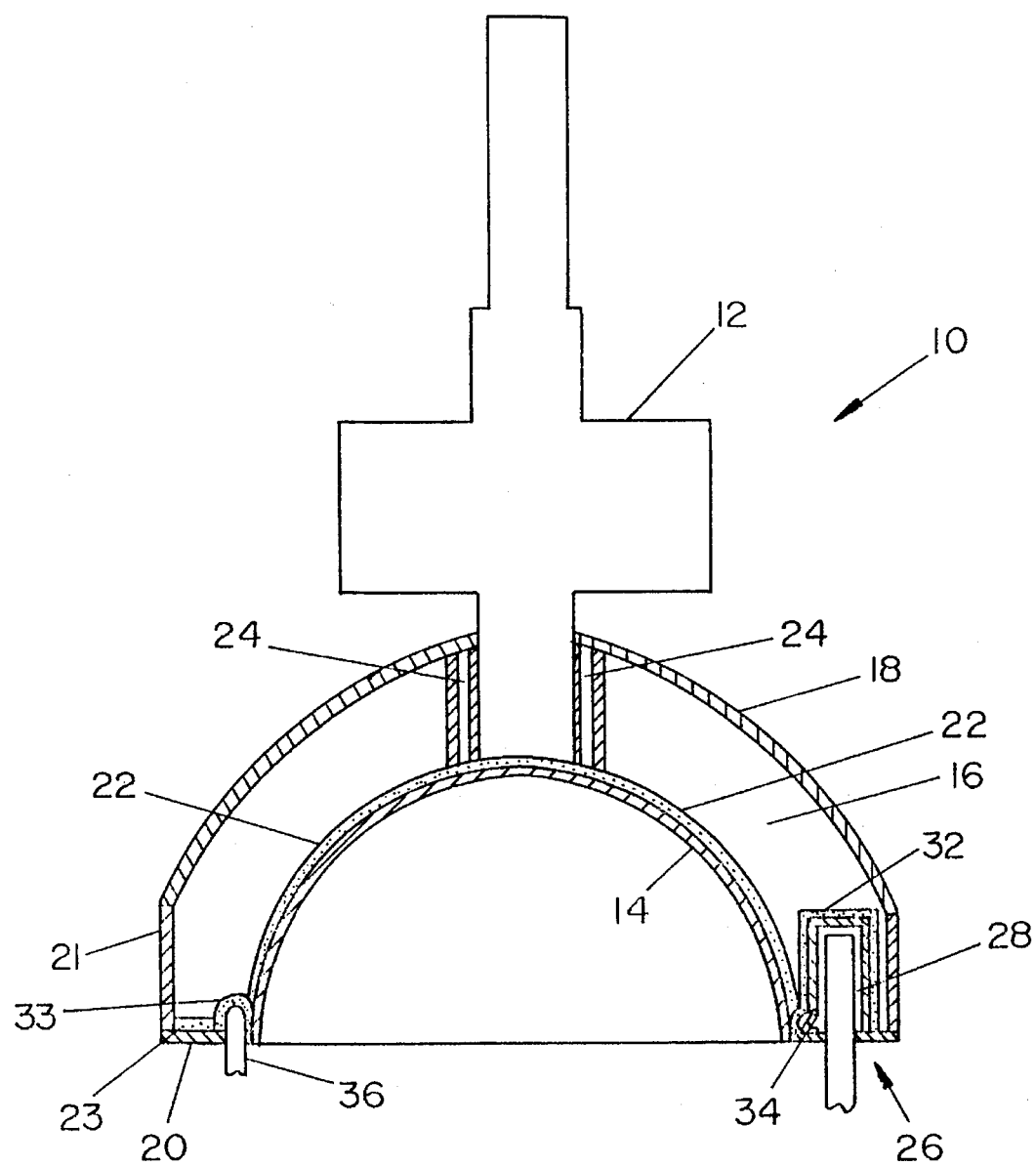
FIG. 1 is a cross section view of the solar collector assembly of the preferred embodiment of the invention.

FIG. 1 is a cross section view of solar collector assembly 10 of the preferred embodiment of the invention in which solar collector assembly 10 includes a heat utilization device 12, such as a Stirling engine shown only in outline form, solar collector 14, and solar collector heat pipe 16. Solar collector heat pipe 16 is enclosed by solar collector 14, whose shape approximates a hemisphere, back wall 18, which may also be formed as an approximate hemisphere, and junction sections 20 and 21 which interconnect solar collector surface 14 and back wall 18.

Solar collector heat pipe 16 is conventionally constructed with solar evaporator wick 22 in contact with the inner surface of solar collector 14, and capillary arteries 24 interconnecting heat utilization device 12 with solar evaporator wick 22. Thus, when solar energy heats solar collector 14, liquid enclosed within evacuated solar collector heat pipe 16 and collected within solar evaporator wick 22 is evaporated into the volume of solar collector heat pipe 16. The vapor resulting from the evaporation moves to the cooler surfaces of heat utilization device 12 where it is condensed, and the resulting liquid is transported by capillary arteries 24 back to solar evaporator wick 22 where it is again evaporated. This operation is quite conventional, not only for solar collector assemblies, but for heat pipes generally.

In conventional solar collectors with auxiliary heaters, an auxiliary burner is attached to the outside wall of solar collector assembly 10 at junction section 21. In such prior art installations, air is forced through the combustion chamber and over the outer surface of junction section 21, and a capillary evaporator wick within solar collector heat pipe 16 is located on the inner surface of junction section 21 and is heated by the hot air to vaporize the solar collector heat pipe liquid from the evaporator wick. As noted previously, such a structure adds considerable weight and bulk to the solar collector assembly because of the air heat exchanger and its associated structure and insulation. Moreover, such an arrangement also requires particular effort to keep the burner assembly cool enough to prevent its destruction.

In the preferred embodiment of the present invention one or more combustion chambers, only one of which is shown in FIG. 1, are integrated directly into solar collector heat pipe 16 by forming reentrant cavities 28 near the edge of solar collector 14 within solar collector heat pipe 16, and locating a burner assembly 26 within each reentrant cavity 28. As is more clearly shown in FIG. 2, walls 27 and 29 of reentrant cavity 28, which are within the enclosure of solar collector heat pipe 16, are covered with heater evaporator wick 32 which also may be interconnected with solar evaporator wick 22 by interconnecting capillary wick material 33.

With heater evaporator wick 32 and solar evaporator wick 22 interconnected by a capillary flow device such as capillary wick 33, solar evaporator wick 22 functions as a capillary flow path to supply heater evaporator wick 32 with liquid transported by capillary arteries 24 from heat utilization device 12 to solar evaporator wick 22. However, many solar heat pipe assemblies can include sufficient liquid so that gravity alone assures that there will be a puddle 23 of liquid at junction section 20, and, therefore, an interconnecting wick is not required.

One way to interconnect heater evaporator wick 32 with solar evaporator wick 22 is to make use of burner exhaust line 34. Burner exhaust line 34 penetrates each of the burners 26 within solar collector assembly 10 and exhausts the products of combustion from the burners. As such, it is convenient to locate burner exhaust line 34 within solar collector heat pipe 16, and for burner exhaust line 34 to follow the edge of solar collector 14 around to each burner. Although only one exhaust outlet 36 is seen in FIG. 1, it is quite practical to have several such exhaust outlets along exhaust line 34. Moreover, exhaust line 34 is located in contact with both the inner surface of solar collector 14 which includes solar evaporator wick 22 and with the surface of reentrant cavity 28 and heater evaporator wick 32 which is within solar collector heat pipe 16.

Therefore, all that is required to form interconnecting wick 33 between solar evaporator wick 22 or liquid puddle 23 and heater evaporator wick 32 is for exhaust line 34 to be covered with capillary wick material over its outer surface which is exposed within solar collector heat pipe 16. A further advantage of such an arrangement is that exhaust line 34 is itself heated by the combustion products of the burner and wick 33 around exhaust line 34 also acts as an extension of heater evaporator wick 32.

Figure 2:
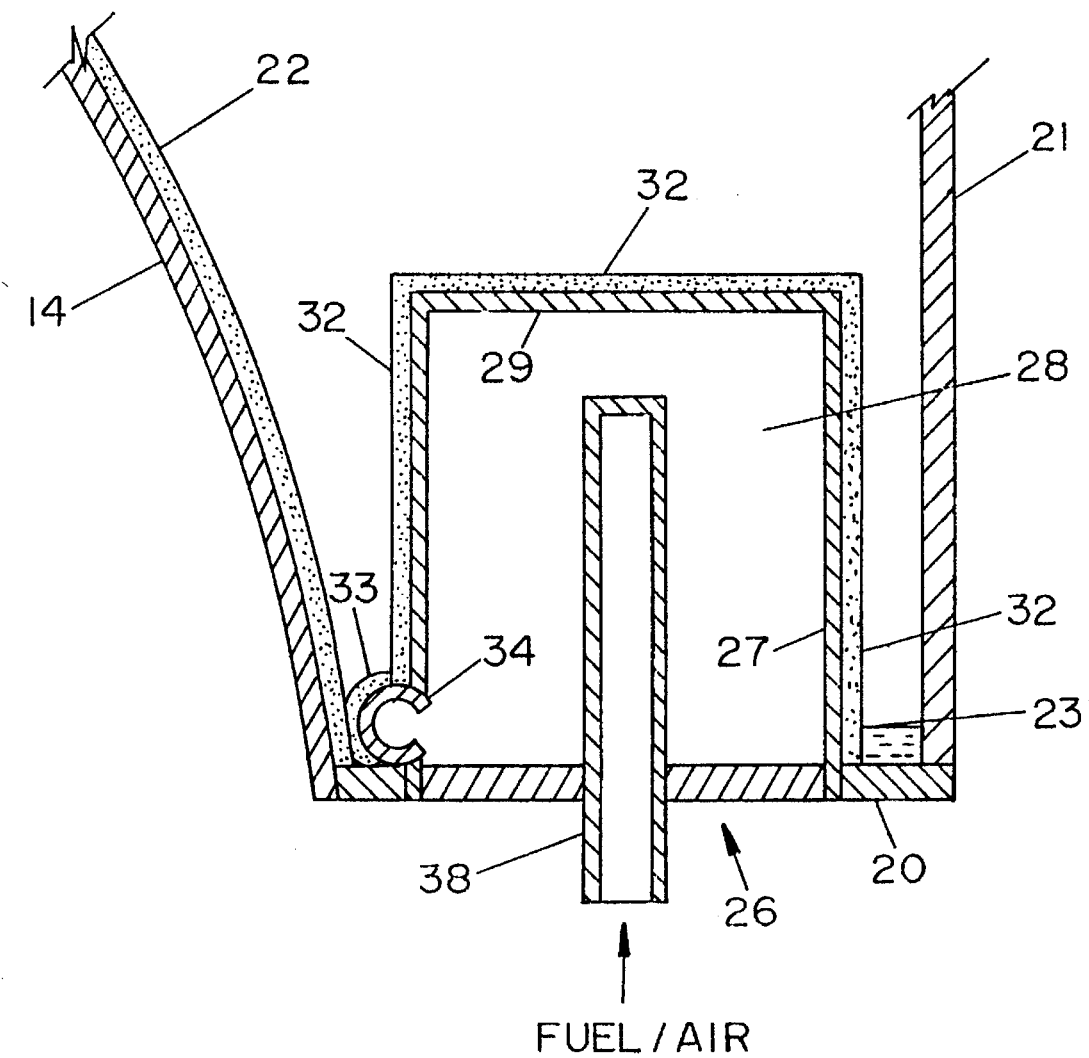
FIG. 2 is a cross section view of the region of FIG. 1 near the auxiliary burner used within the preferred embodiment of the invention.

FIG. 2 is a cross section view of gas burner assembly 26 used within solar collector assembly 10, and is actually an enlarged view of the same region in FIG. 1. Gas burner assembly 26 is installed within reentrant cavity 28 whose walls 27 and 29 are covered with heater evaporator wick 32 on their surfaces which are within solar collector heat pipe 16. Burner 38 is a conventional burner fed an appropriate mixture of fuel and air. The products of combustion from burning the fuel are collected by exhaust line 34 which is open only within gas burner assembly 26 and at exhaust outlet 36.

Exhaust outlet line 34 is continuous and is located at the edge of solar collector 14 within solar collector heat pipe 16. Exhaust outlet line 34 can be covered with capillary wick material which forms interconnecting wick 33 in contact with solar evaporator wick 22 and heater evaporator wick 32. Interconnecting wick 33 can therefore provide a continuous capillary path between solar evaporator wick 22 or puddle 23 and heater evaporator wick 32, so that liquid furnished to solar evaporator wick 22 and not evaporated from it is pumped by capillary action to exhaust line wick 33 and heater evaporator wick 32 from which it can be evaporated by the heat generated within burner assembly 26.

Figure 3:
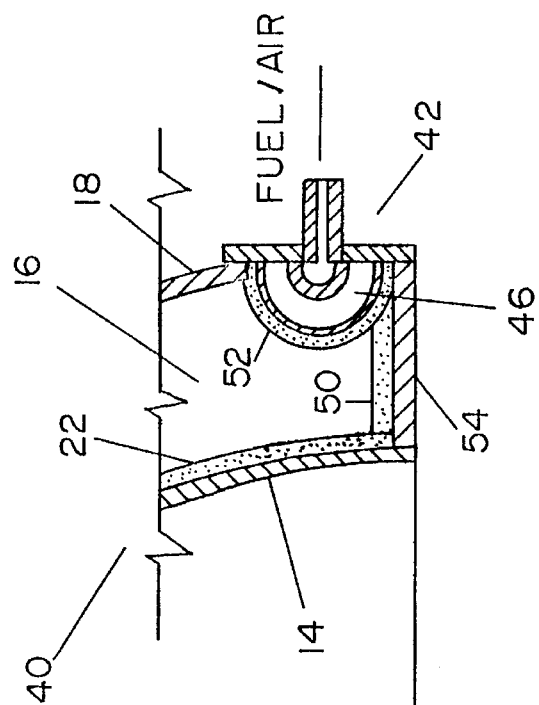
FIG. 3 is a cross section view of a portion of a solar collector assembly of an alternate embodiment of the invention with a burner cavity of a different configuration.
Figure 3:
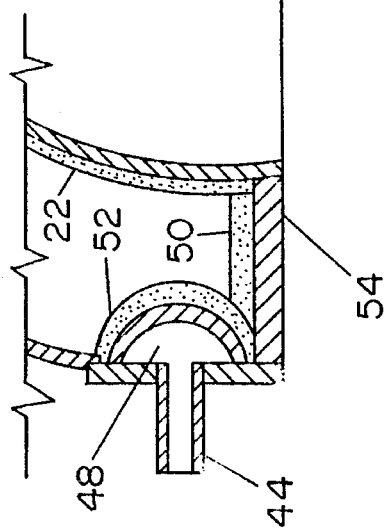

FIG. 3 is a cross section view of only a portion of solar collector assembly 40 which is an alternate embodiment of the invention. Solar assembly 40 differs from solar collector assembly 10 in FIG. 1 only in the configuration and location of the associated combustion chamber. In FIG. 3 burner assembly 42 and exhaust outlet 44 are constructed so that they penetrate back wall 18 in order to be located within solar collector heat pipe 16.

FIG. 3 also shows an alternate shape for combustion chamber 46, which is built as an annular section of pipe. This configuration permits combustion chamber 46 to be integrated into exhaust line 48 which is also an annular section of pipe and is continuous around the lower portion of back wall 18. The only other significant difference between FIG. 1 and FIG. 3 is that the interconnecting wick is located differently, as shown by interconnecting wick 50 in FIG. 3, to provide a continuous capillary path from heater evaporator wick 52, which covers combustion chamber 46 and exhaust line 48, to solar evaporator wick 22. With the structure of FIG. 3, an appropriate structure to connect the two evaporator wicks is a simple capillary wick layer 50 covering junction section 54. However, as previously noted, the solar collector heat pipe can also be designed so that liquid collects on the inside of junction section 54. In such a design, wick 50 would simply be replaced by a puddle of liquid.

Figure 4:
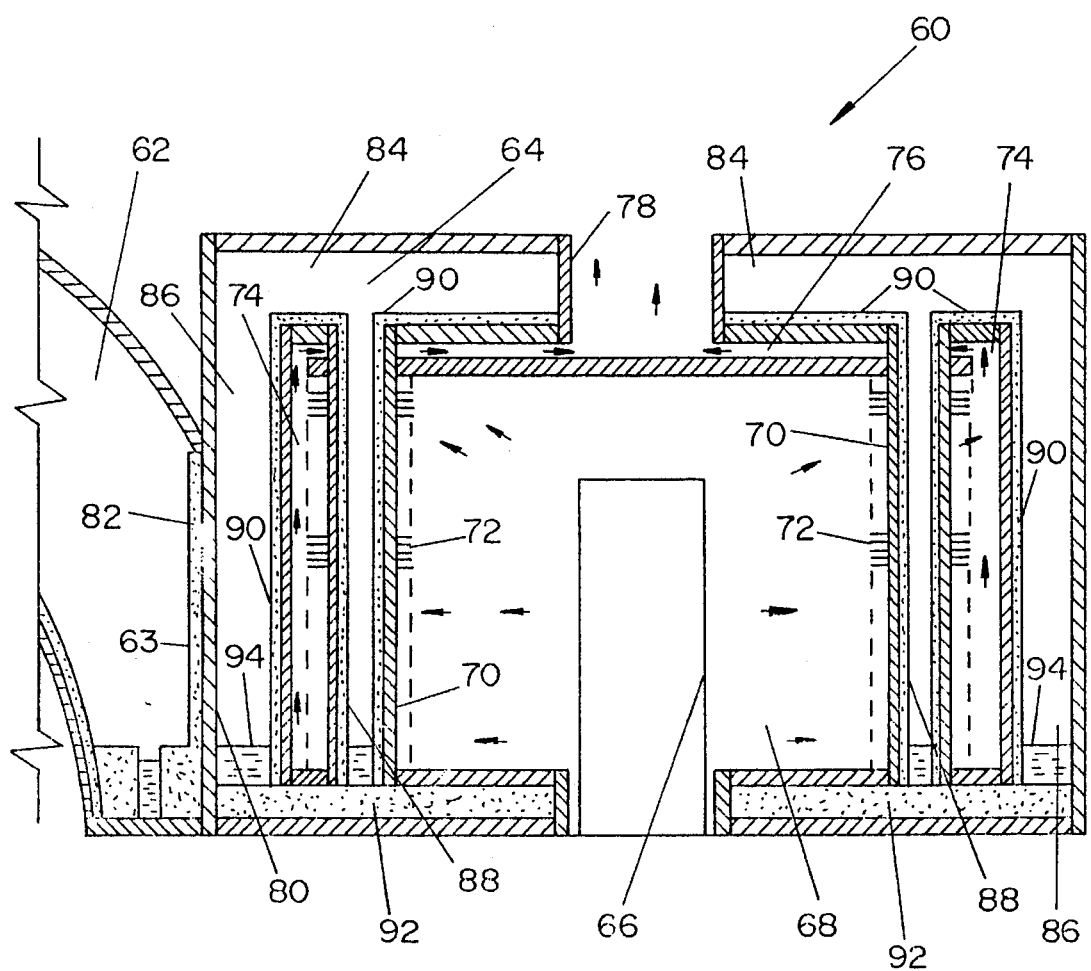
FIG. 4 is a cross section view of an alternate embodiment of the invention in which the burner assembly is coupled to the solar collector heat pipe by an additional burner heat pipe.

FIG. 4 is a cross section view of an alternate embodiment of the invention in which burner assembly 60 is coupled to solar collector heat pipe 62 by burner heat pipe 64. Conventional fuel burner 66 is enclosed within combustion chamber 68 which includes an array of individual cylindrical evaporator tubes 70 to which are attached multiple heat transfer fins 72. In the embodiment shown in FIG. 4, evaporator tubes 70 form a circular fence-like array around burner 66, and the fins 72 on each evaporator tube 70 are adjacent to the fins of the adjacent evaporator tubes in the circle. Heat generated by burner 66 is radiated to evaporator tubes 70, and hot exhaust gases move through fins 72 into annular space 74 beyond evaporator tubes 70. Thus, evaporator tubes 70 are heated, and liquid within evaporator wick 88 on the interior surfaces of evaporator tubes 70 is evaporated. The exhaust gases then move into exhaust manifold 76 at one end of assembly 60 and out exhaust pipe 78. The path of the exhaust gases is shown in FIG. 4 by a series of short arrows.

Burner heat pipe 64 is formed by multiple evaporator tubes 70, condenser section 80 which is integral with outer surface 82 of solar heat pipe 62, heat pipe manifold 84, and annular chamber 86. Evaporator tubes 70 all open into heat pipe manifold 84, which is continuous with annular chamber 86, and condenser 80 is located within annular chamber 86. Thus, vapor generated within evaporator tubes 70 has direct access to condenser section 80 of burner heat pipe 64, where it condenses to heat solar heat pipe 62 and evaporate liquid from solar heat pipe auxiliary evaporator wick 63.

The interior surface of each evaporator tube 70 is covered with evaporator wick 88, and auxiliary wick 90 is continuous with evaporator wick 88 and is located upon the surfaces of heat pipe manifold 84 and annular chamber 86, which are both heated by exhaust gases. Collector wick 92 is located between condenser section 80 and evaporator tubes 70 in a relatively cooler location within burner assembly 60. Collector wick 92 is also continuous with auxiliary wick 90 and evaporator wick 88. With all the wicks 88, 90 and 92 interconnected to each other, excess liquid 94 collecting at condenser 80 is easily available to evaporator tubes 70 for evaporation there, and is also available to supply liquid to auxiliary wick 90 where the liquid is heated by exhaust gases from burner 66 as the exhaust gases leave assembly 60.

It should be appreciated that the structures of the invention all perform the dual function of not only heating the solar collector heat pipe, but also cooling the burner combustion chambers. The great advantage of the invention is that it requires no auxiliary cooling of the combustion chambers and no insulation around them. The evaporator wicks on the walls of each combustion chambers, whether they are the wicks of the solar heat pipe or of intermediate heat pipes within the combustion chamber, are all that is required to effectively cool the combustion chamber. Moreover, the evaporator wicks on the walls of the burners efficiently transfer the heat generated at the burners to the solar collector heat pipe without the forced air heat exchangers of the prior art systems. Eliminating such external heat exchangers not only makes the heat transfer more efficient, but also reduces the size, weight, and cost of the solar collector assembly.

It is to be understood that the forms of this invention as shown are merely preferred embodiments. Various changes may be made in the function and arrangement of parts; equivalent means may be substituted for those illustrated and described; and certain features may be used independently from others without departing from the spirit and scope of the invention as defined in the following claims.

For example, it should be appreciated from the similarities between FIG. 1 and FIG. 3 that the exact configuration and location of the combustion chambers within which the auxiliary burners are located are not critical. Moreover, arteries 24 furnishing condensed liquid to solar evaporator wick 22 could be replaced with another capillary device such as a capillary wick.

What is claimed as new and for which Letters patent of the United States are desired to be secured is:

1. In a solar collector assembly of the type which includes a solar heat pipe formed as a sealed enclosure, with one wall of the solar heat pipe being a solar collector which has a solar evaporator wick on the surface of the solar collector wall within the solar heat pipe; a heat utilization device acting as the condenser of the solar heat pipe; capillary means delivering condensed liquid from the condenser to the solar evaporator wick; a fuel burning heater to furnish auxiliary heat to the solar heat pipe; a combustion chamber enclosing the fuel burning heater; a fuel delivery means supplying fuel and air to the heater; and an exhaust means open to the interior of the combustion chamber to exhaust combustion products from the burner; the improvement comprising:

the combustion chamber including at least one surface which is heated by the fuel burning heater, with the heated surface including a first side within the combustion chamber and a second side outside the combustion chamber;

a burner evaporator wick attached to the second side of the heated surface; and a heat pipe enclosing the burner evaporator wick on the second side of the surface, with the heat pipe removing heat from the combustion chamber and with the heat pipe including a condenser section to condense evaporated vapor and a delivery means to supply liquid condensed within the condenser section to the burner evaporator wick further including:

at least one cavity formed in a wall of the solar heat pipe enclosure other than the solar collector wall, with the cavity forming the combustion chamber and having at least one surface exposed within the solar heat pipe; and the burner evaporator wick being located within the solar heat pipe and covering a surface of the cavity which is exposed within the solar heat pipe, so that the solar heat pipe is the heat pipe enclosing the burner evaporator wick.

2. The solar collector assembly of claim 1 further including:

an interconnecting capillary wick located within the solar heat pipe and in contact with both the solar evaporator wick and the burner evaporator wick, so that liquid within the solar heat pipe is moved by capillary action between the solar evaporator wick and the burner evaporator wick.

3. The solar collector assembly of claim 1 wherein the cavity is a reentrant cylinder located adjacent to the edge of the solar collector.

4. The solar collector assembly of claim 2 wherein the exhaust means is tubing located within the solar heat pipe adjacent to the solar collector, and the interconnecting capillary wick is a capillary wick located on the outside surface of the tubing and in contact with the solar evaporator wick and the burner evaporator wick.

5. The solar collector assembly of claim 1 wherein the combustion cavity and the exhaust means are both within an annular section of pipe located within the solar heat pipe, and the burner evaporator wick is a capillary wick located on the outside surface of the annular section of pipe.

6. In a solar collector assembly of the type which includes a solar heat pipe formed as a sealed enclosure, with one wall of the solar heat pipe being a solar collector which has a solar evaporator wick on the surface of the solar collector wall within the solar heat pipe; a heat utilization device acting as the condenser of the solar heat pipe; capillary means delivering condensed liquid from the condenser to the solar evaporator wick; a fuel burning heater to furnish auxiliary heat to the solar heat pipe; a combustion chamber enclosing the fuel burning heater; a fuel delivery means supplying fuel and air to the heater; and an exhaust means open to the interior of the combustion chamber to exhaust combustion products from the burner: the improvement comprising:

the combustion chamber including at least one surface which is heated by the fuel burning heater, with the heated surface including a first side within the combustion chamber and a second side outside the combustion chamber;

a burner evaporator wick attached to the second side of the heated surface; and a heat pipe enclosing the burner evaporator wick on the second side of the surface, with the heat pipe removing heat from the combustion chamber and with the heat pipe including a condenser section to condense evaporated vapor and a delivery means to supply liquid condensed within the condenser section to the burner evaporator wick;

wherein the burner evaporator wick is located within an intermediate heat pipe which has a condenser and a collector wick which is the delivery means to move liquid from the condenser to the burner evaporator wick, the intermediate heat pipe transfers heat from the combustion chamber to the solar heat pipe, and the condenser of the intermediate heat pipe is in contact with a surface of the solar heat pipe to which is attached a solar heat pipe auxiliary evaporator wick.

7. The solar collector assembly of claim 6 wherein the burner evaporator wick is located within evaporator tubes which are arranged around the fuel burning heater and the intermediate heat pipe condenser is within an annular structure around the evaporator tubes.

8. The solar collector assembly of claim 7 wherein heat transfer fins are attached to the evaporator tubes and are located in the path of exhaust products leaving the fuel burning heater.

\* \* \* \* \*